Jan. 3, 1967   E. T. HALL   3,296,469
SOLAR MOTOR
Filed June 25, 1963   3 Sheets-Sheet 1

INVENTOR.
EDWARD T. HALL
BY
Lippincott, Ralls & Hendricson
ATTORNEYS

Jan. 3, 1967  E. T. HALL  3,296,469
SOLAR MOTOR

Filed June 25, 1963  3 Sheets-Sheet 2

INVENTOR.
EDWARD T. HALL
BY
Lippincott, Ralls & Hendricson
ATTORNEYS

Jan. 3, 1967  E. T. HALL  3,296,469
SOLAR MOTOR
Filed June 25, 1963  3 Sheets-Sheet 3
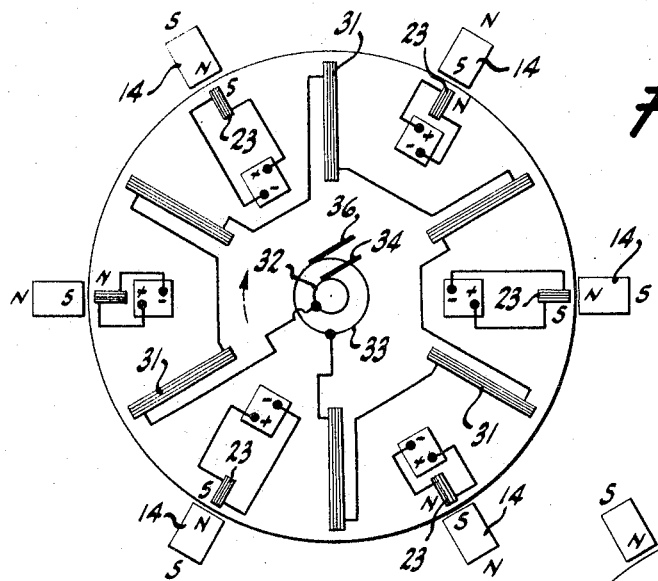
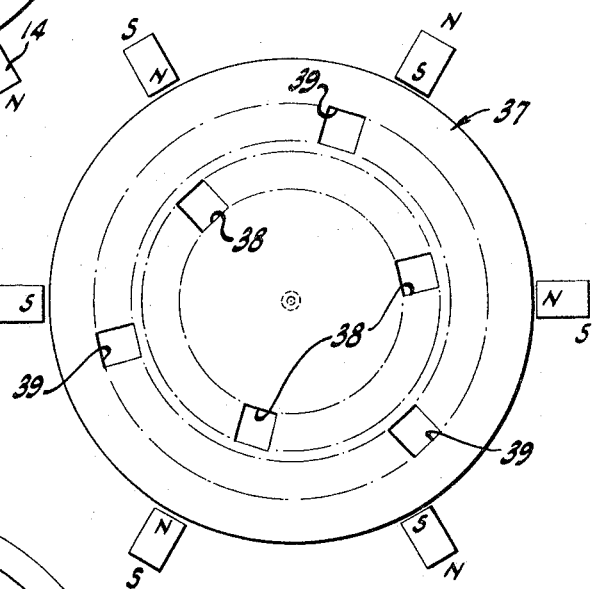
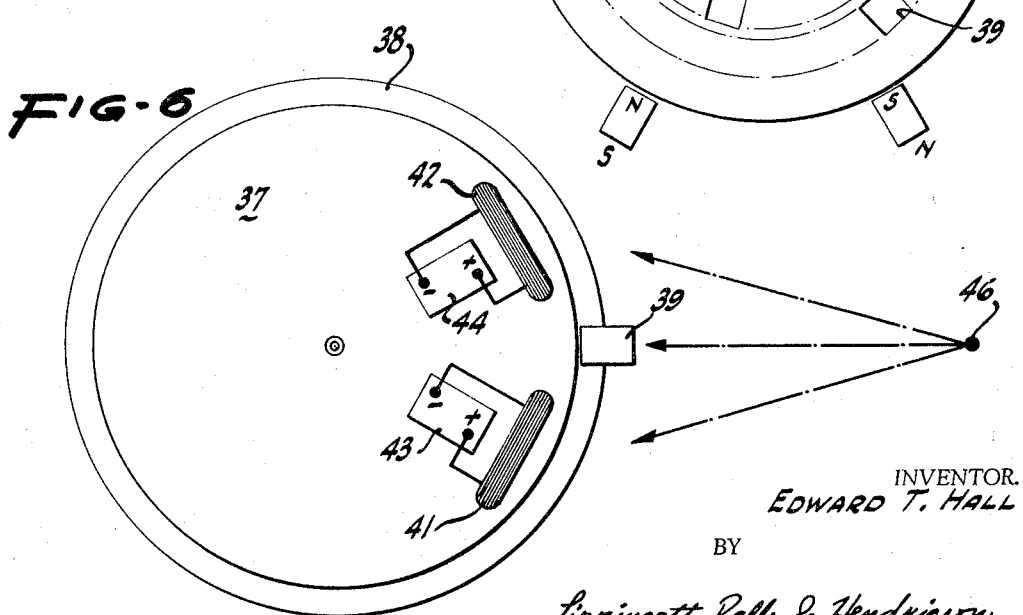
INVENTOR.
EDWARD T. HALL
BY
Lippincott, Ralls & Hendrickson
ATTORNEYS

United States Patent Office 3,296,469
Patented Jan. 3, 1967

3,296,469
SOLAR MOTOR
Edward T. Hall, 2091 W. F St., Napa, Calif. 94558
Filed June 25, 1963, Ser. No. 290,390
6 Claims. (Cl. 310—46)

The present invention relates generally to means for directly converting solar energy into rotational energy, and is more particularly directed to a solar motor which operates in the presence of light without requirement of any other external source of energy.

Various photovoltaic devices are well known which are operable to directly convert light energy to electric energy. These photovoltaic converters, or solar cells as they are often termed, find widespread use in space applications, various amusement and novelty items, and the like. Inasmuch as solar cells do not suffer appreciable deterioration from aging, they represent useful sources of electricity which last indefinitely and only require the sun, or another source of light for their operation. This latter characteristic of substantially unlimited life is responsible for the widespread use of solar cells in space vehicles as auxiliary power sources, primary batteries being unsuited to this purpose because their useful life is usually considerably less than the duration of the space mission. Similarly, the use of solar cells to power toys, etc., is desirable from the standpoint that no replacement of batteries is required. Heretofore, however, solar cells have been strictly used as sources of direct current in the manner of a common battery. Where rotational energy has been required, such energy has been derived indirectly from a solar cell connected in energizing relation to a conventional electric motor in the manner of a dry cell, or the like. In other words, the solar cell has been an auxiliary item to the motor, or other rotational energy producing device, such that where rotational energy has been required, two separate elements have been employed in accomplishing the over-all conversion of light energy to rotational nergy. Advantages are, of course, to be gained by the utilization of a single unit to provide the rotational energy in response to light incident thereon. The present invention directly produces a rotational output from a light input.

Accordingly, it is an object of the present invention to provide means for directly converting light energy into rotational energy whereby rotation is produced in response to the presence of the sun, or another light source.

Another object of the invention is the provision of a solar motor which is directly motivated by incident light.

Yet another object of the invention is to provide a motor having photovoltaic converters which rotate as an integral part of the rotor and convert light energy into electrical energy for energizing rotor coils to generate magnetic fields which interact with magnetic fields of stator magnets and thereby impart torque to the rotor.

It is still another object of the invention to provide a direct current motor which does not require a commutator in its operation and which is, therefore, free of the usual inherent electric commutator noise.

It is another object of the invention to provide a device of the class described which may be readily adapted to generate alternating current or pulsating direct current.

Yet another object is to provide a solar motor which will run by using the earth's magnetic field in lieu of the conventional magnetic field of permanent magnets or electric magnets.

It is a further object of the invention to provide a solar motor whose direction and speed of rotation may be readily varied.

A still further object of the invention is the provision of a device of the general class described which may be employed for light seeking purposes.

An even further object of this invention is to provide a solar motor which will run without an aperture mask.

Further objects and advantages of the invention will become apparent upon consideration of the following description in conjunction with the accompanying drawings, wherein:

FIGURE 4 is a schematic illustration of a modified form of the motor as arranged to generate an alternating current;

FIGURE 5 is a plan view of a mask for employment with the embodiment of FIGURE 4; and FIGURE 6 is a schematic illustration of a modified form of the invention for light seeking purposes.

Figure 1:
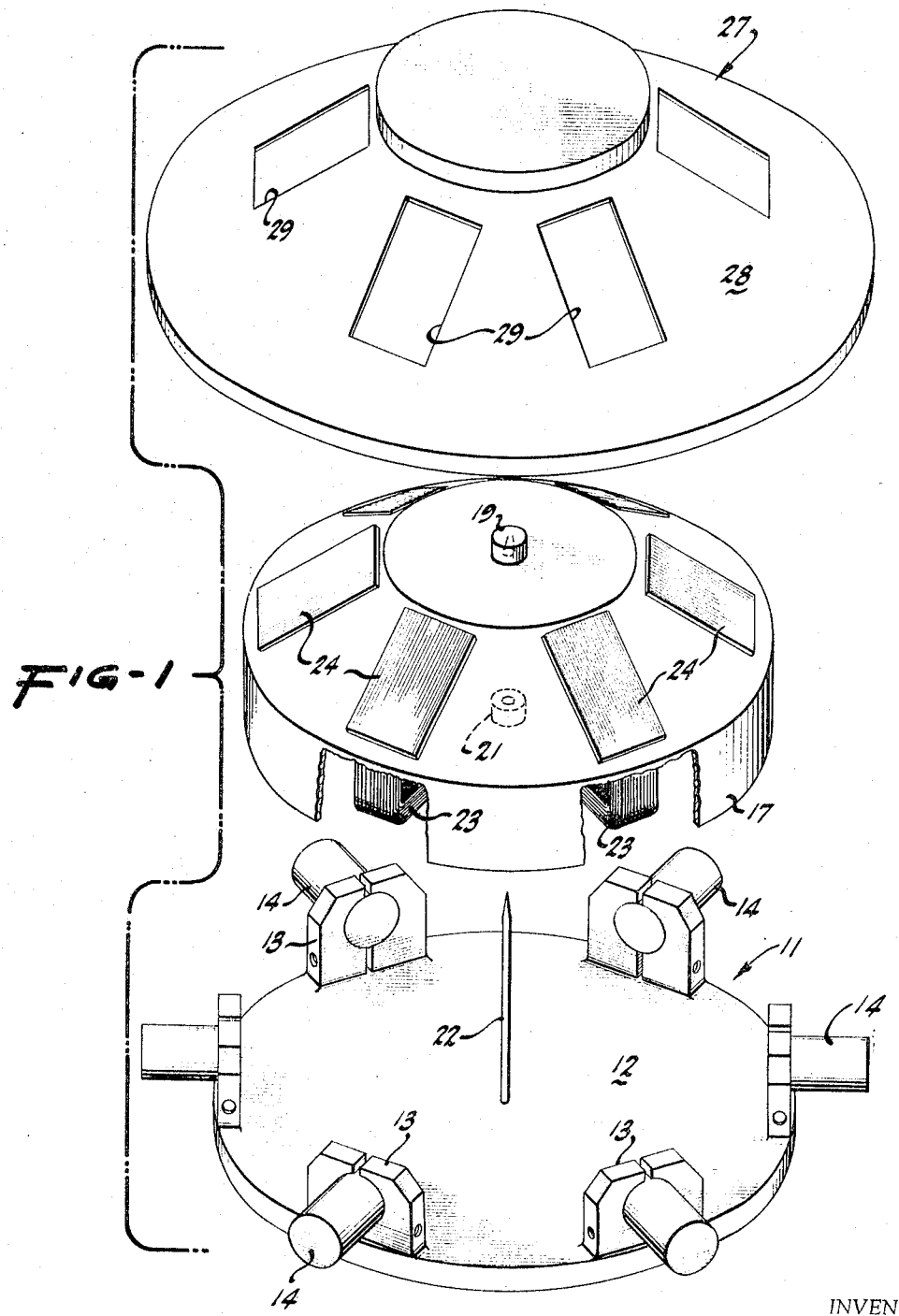
FIGURE 1 is an exploded perspective view of a prototype solar motor for demonstrating the principles of the present invention.

Considering now the invention in some detail and referring to the illustrated forms thereof in the drawings, there will be seen to be provided means for the direct conversion of solar energy into rotational energy which may be variously applied as a motor, motor generator, light responsive instrument, and the like. The conversion means includes a stator having at least one field magnet, and a rotor mounted for rotation concentrically of the stator. A plurality of armature coils are carried by the rotor at circumferentially spaced positions thereof, and the magnetic fields generated by these coils, upon their energization, interact with the field of the stator magnet to produce forces productive of rotation of the rotor with respect to the stator. A plurality of photovoltaic energy converters, each including at least one solar cell, are also carried by the rotor and connected in energizing relation to the coils. In response to the impingement of sunlight, or light from another source, the converters generate electric currents which flow through the coils and, hence, constitute the energization thereof. Finally, means are provided to direct light on the cells at positions adjacent the field magnet while preventing the impingement of light at other positions the converters may assume with respect to the stator during the rotation of the rotor. Accordingly, the converters are energized in the vicinity of the field magnet such that the fields generated by the coils are sufficiently proximate the field of the field magnet to vigorously interact with same. Where continuous rotation of the rotor is desired, as in the instance of a motor, light is blocked from the converters as the coils respectively associated therewith are directly opposite the field magnet such that no fields are generated at this time which would interact with the field magnet in a static manner to lock the rotor against further rotation. In other words, in the case of a motor or the like, the means directing light on the converters is such that each converter is energized immediately adjacent the field magnet with the magnetic field generated by its associated coil being such to, for example, attract the rotor tangentially towards the field magnet, and to de-energize the coil when the current would generate a magnetic field that would interact with the field magnets to impede the motion of the rotor. Each of the converters in succession is subjected to the foregoing energization and de-energization action of the light source means as the converter approaches and then passes directly opposite the field magnet, whereby the rotation of the rotor is continuous. Where a plurality of field magnets are employed on the stator, the light is directed on the converters at positions more closely adjacent one field magnet than the other of each successive pair thereof in order to avoid the establishment of static force conditions between the rotor and stator which would tend to prevent rotor rotation.

Figure 2:
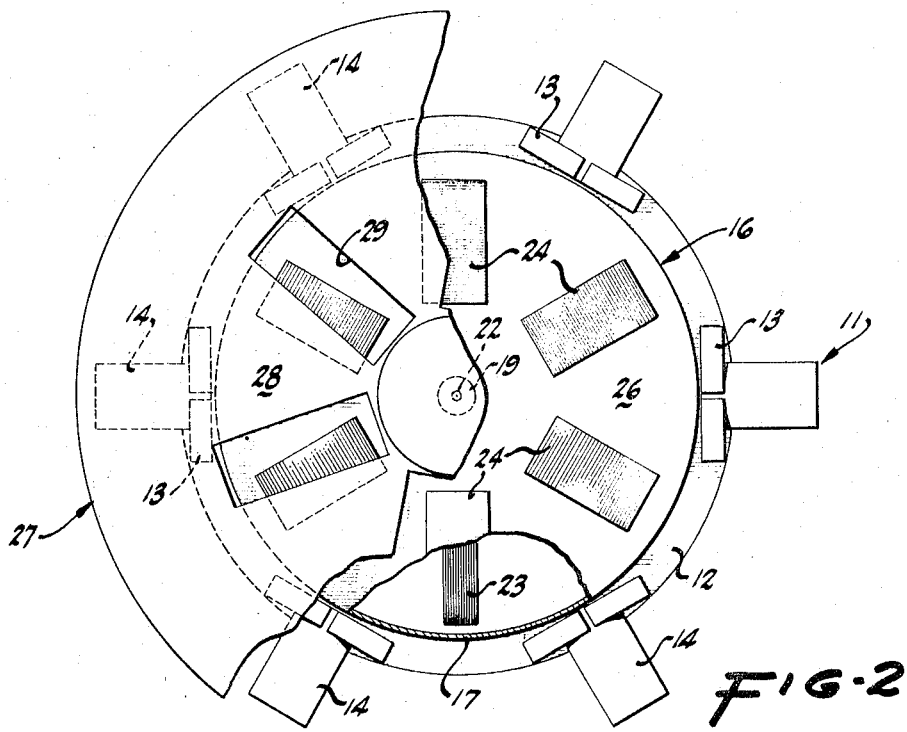
FIGURE 2 is a plan view of the motor with portions broken away to show the interior construction.
Figure 3:
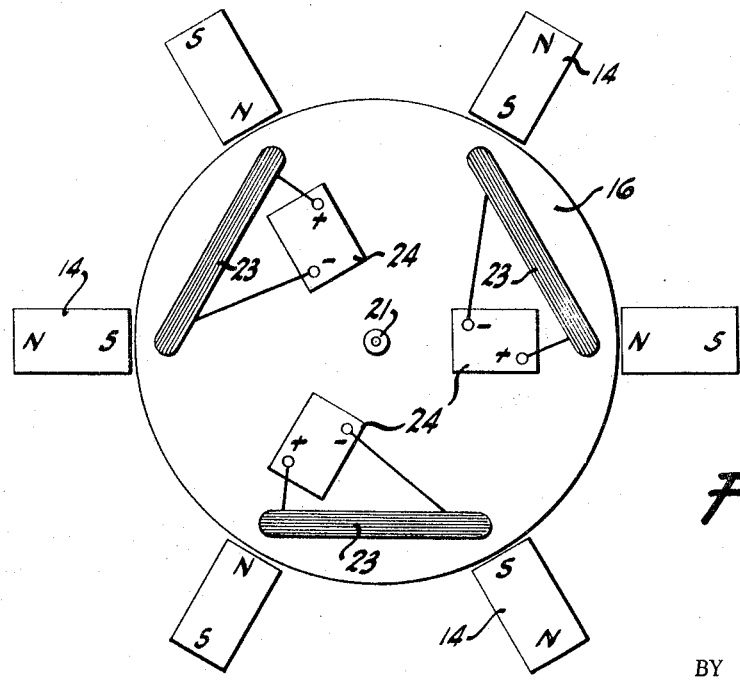
FIGURE 3 is a schematic illustration depicting one wiring arrangement of the rotor coils with respect to the field magnets.

The invention will be better understood upon consideration of the specific structural embodiment thereof as depicted in FIGURES 1–3 which illustrate a prototype of a solar motor with respect to which the principles of the invention are hereinafter described in detail. The solar motor will be seen to include a stator 11, which is herein provided as a circular base plate 12 having a plurality of lugs 13 upstanding therefrom at circumferentially spaced peripheral positions. The lugs are respectively apertured to receive a plurality of permanent cylindrical bar magnets 14 of alnico, or the like, extending radially through the lugs to terminate at positions preferably flush with the interior faces thereof. The lugs thus serve to position the magnets radially at circumferentially spaced points about the periphery of the stator.

The motor further includes a rotor 16 which in the present instance is provided as a hollow generally cylindrical form 17 of thin-walled lightweight non-magnetic material, such as plastic. It should be noted, however, that the motor will work with greater efficiency if a permeable magnetic material is used for the rotor, and therefore in a production model of the motor a rotor of permeable material is preferable. The rotor form 17 is adapted for rotational mounting upon the stator concentrically within the upstanding lugs 13 thereof. It is highly advantageous from the standpoint of minimizing drag on the rotor, that extremely low friction bearing means be employed in the mounting thereof upon the stator. One low friction bearing mounting means which may be advantageously employed includes low friction journal and thrust bearings 19 and 21, respectively, mounted upon the top and base faces of the form 17 coaxially thereof and receiving a needle shaft 22 which projects coaxially upwardly from the base plate 12 of the stator. Such needle type pvot bearing means renders the rotor form 17 rotatable with respect to the stator with negligible friction.

The rotor 16 further includes a plurality of armature coils 23 mounted upon the form 17 at circumferentially spaced positions of correspondence with the stator or field magnets 14. Upon energization with electrical current, the coils 23 generate magnetic fields which interact with the fields of the magnet 14 in a manner subsequently described to effect rotation of the rotor with respect to the stator. The coils may be mounted upon the rotor with various orientations, and in this regard, it is to be noted that the coils may be radially disposed with their axes tangential relative to the rotor form, as depicted in FIGURES 1 and 2. Alternatively, the coils may be mounted adjacent the inner peripheral face of the form 17 with their axes radially disposed. Under certain circumstances where the latter orientation is employed, the coils preferably fool tangential spans which substantially bridge adjacent ones of the field magnets, as depicted in FIGURE 3, for advantageous purposes subsequently described.

In accordance with a particularly salient aspect of the invention, the coils 23 are herein energized by a plurality of solar cells 24, or equivalent photovoltaic energy converters, which are mounted upon the top face of the rotor form 17 at circumferentially spaced positions of correspondence with the coils 23, and are connected in electrical energizing relation thereto. Preferably, the cells 24 are mounted upon an inclined rim portion 26 of the upper face of the rotor form 17 having an angle, of the order of 40°, to the horizontal for purposes subsequently described.

The motor is completed by a generally dome-shaped mask 27 which is adapted for securance to the stator 11 in encompassing relation to the top face of the rotor 16. In the instant prototype, the mask 27 is of substantially circular configuration including a downwardly inclined rim portion 28 which is conformed to and adapted to overlie the inclined rim portion 26 of the rotor form 17. The mask includes a plurality of circumferentially spaced windows or apertures 29 which are preferably of a rectangular configuration substantially corresponding to that of the solar cells 24. In the prototype, the mask 27 is secured to the upstanding lugs 13 of the stator and the apertures 29 overlie the inclined rim portion 26 of the rotor form at positions which are closely adjacent the stator magnets 14, in the present case positions which are slightly angularly displaced in the counterclockwise direction from the magnets 14, as best shown in FIGURE 2. Thus, with sunlight, or light from another source, impinging the mask 27, the apertures 29 permit the light to pass therethrough and impinge the solar cells 24 when the are correspondingly disposed at positions immediately adjacent the magnets 14. In this regard, it is of importance to note that the apertures 29 are closer to one magnet of each adjacent pair thereof than the other. More particularly, the apertures are not positioned directly between adjacent ones of the magnets 14. Although the apertures are depicted as being displaced in the counterclockwise direction from the magnets in close-spaced relation thereto, the apertures may alternatively be closely spaced in the clockwise direction with the resulting difference in the operation of the motor, as will be subsequently explained, being a reversal in the direction of rotation of the rotor 16. Accordingly, in a production model of the motor, the mask 27 rather than being in fixed stationary position with respect to the stator 11, is more preferably selectively rotatable with respect thereto. The mask may then be selectively rotated to positions wherein the apertures 29 are positioned on opposite sides of the magnets 14 to thereby effect a reversal in rotor rotation.

Considering the operation of the motor in greater detail and referring to FIGURE 3, it is first to be noted that the coils 23 are illustrated in positions which are immediately subjacent the apertures 29 of the mask 27. Furthermore, the sun, or another light light source, is assumed to be positioned at a location offset from the mask whereby the light is transmitted through the apertures and impinges the underlying solar cells 24. In this regard, it should be noted that by virtue of the inclined rim portion 26 upon which the solar cells are mounted, the light source may be positioned on a level substantially equal to that of the upper face of the mask 27, and, in fact, slightly below the level thereof, and the light rays emanating from the source will still pass through the mask apertures 29 and impinge the solar cells 24. The coils 23 are variously connected to their associated solar cells 24 to provide current flows productive of magnetic fields which have varied polar relations to the fields of the magnets 14. More particularly, the coils may be connected to the cells in such a manner that all coils induce magnetic fields that interact with the fields of the pole magnets to produce a torque. Any wire carrying a current at right angles to a magnetic field experiences a force that is perpendicular to both the magnetic field and the current. Reversing either the current or the magnetic field will reverse the direction of the force whose magnitude is proportional to the product of the current magnitude and the magnitude of the magnetic field.

The apertures in the mask are arranged so that maximum current flows in the coil when the wires are positioned so that a maximum torque is produced in the desired direction of rotation. When a coil is positioned so that a retarding torque would be generated the mask reduces the light to the solar cells and thus reduces the current through the coil. In this manner, a net torque is supplied to keep the rotor in motion. Any number of schemes of pole sequence and winding span may be used on this motor. The considerations for optimum design are efficient utilization of the electrical conductors, efficient utilization of the magnetic flux available in the permanent magnets and the design of a mask aperture that will minimize current flow past the magnetic poles in a direction that will impede the desired rotation. As an example, the magnets 14 may be oriented such that successive ones are alternately of opposite polarity as depicted in FIGURE 4. In this case, the coils are arranged so that the current in the wires adjacent to the poles flows in opposite directions.

Assuming the arrangement of FIGURE 3 purely for illustrative purpose, the solar cells 24 in their indicated positions are all energized by light passing through the mask apertures 29, whereby the coils are energized so that the current in them interacts with the magnetic fields produced by a pair of adjacent field magnets, which in the present instance are of opposite polarities. Inasmuch as the coils substantially bridge adjacent field magnets and since both the direction of current flow and the magnetic field are reversed from one side of a coil to the other side of the same coil while the fields of adjacent magnets are respectively of opposite polarities, the torque generated is in the same direction for all windings As the rotor turns in response to this torque, the windings will move closer to magnets whose fields would interact with the currents in the windings in a manner that would oppose the desired direction of rotation. However, this motion also moves the solar cell under the closed portion of the aperture mask so that no light falls on the solar cell, the coils are de-energized and the armature is carried past this region by inertia. Alternatively, it would be possible to place a second set of coils with solar cells 24, between those indicated in FIGURE 3. These cells would be exposed when the other set of cells are obscured so that no dead zones would exist in the motor.

As each of the solar cells passes beneath the aperture associated with the next successive magnet, light again strikes and energizes the cell and a current is established in the coil which interacts with the magnetic field, again exerting a torque continuing the rotation. If the mask were rotated so that the aperture was opposite the south magnetic pole instead of the north magnetic pole, the direction of rotation of the motor would be reversed. The speed and direction of the motor are continuously adjustable by the position of the aperture mask with respect to the pole magnets 14.

The torque producing forces exerted on the rotor by interaction between the respective coils and magnets are also dependent to some extent upon the intensity of light impinging the respective cells which energize the coils. Where the light source is not centered with respect to the mask, but rather is displaced to one side thereof, a greater intensity of light may impinge the cells through the proximal mask apertures with respect to the source than impinges the cells through the distal apertures relative thereto. Greater torque producing forces are accordingly associated with the coils connected to cells subjected to the higher light intensity then are associated with the coils connected to cells subjected to the lower light intensity. In other words, the forces acting on the rotor are unbalanced about its periphery. The force unbalance stresses the rotor bearings and tends to increase frictional drag on the rotor. In a large motor, this force unbalance may be seriously detrimental to motor operation. Accordingly, in some situations it is desirable that provision be made to insure that the forces acting upon the rotor are balanced, irrespective of the position of the light source. This may be readily accomplished through appropriate interconnection of the coils and their associated cells. For example, where the coils 23 are arranged to generate magnetic fields of the same polarity, the coils and their associated cells may be all connected in parallel. As a result, the currents generated by the respective cells are combined to provide a resultant current for distribution to the coils. Assuming the coils to be substantially identical to each other, the resultant current is divided uniformly among the coils. Substantially equal currents thus flow through the respective coils and balanced forces are thereby imparted to the rotor.

Solar motors of the type outlined hereinbefore may be readily adapted to generate alternating current or pulsating direct current. The efficiency with which same may be generated is, of course, less than the efficiency with which direct current can be generated by the solar cells in their direct conversion of light energy to electrical energy. Despite the reduced efficiency in the conversion of light energy to electrical energy in the form of alternating current or pulsating direct current, the generation of same is desirable in various applications. For example, some electrical systems may be designed to operate on alternating current or pulsating direct current, rather than on continuous direct current and, therefore, the reduction in efficiency can be tolerated by virtue of the requirement for the particular form of current. Under these circumstances, the motor may be modified as illustrated in FIGURES 4 and 5 to facilitate the generation of an alternating current or a pulsating direct current. More particularly, a plurality of generator windings 31 may be carried upon the rotor at circumferentially spaced positions thereof preferably in radial planes extending through the rotor form 17 at positions intermediate the coils 23. The windings 31 are connected in series and the opposite ends of the series string thereof respectively connected to slip rings 32 and 33 coaxially secured to the rotor in insulated relation to each other. To generate pulsating direct current, all of the magnets 14 are oriented such that their inner ends are of the same polarity. Accordingly, as the rotor rotates and the generator windings 31 pass through the magnetic fields generated by the magnets 14, pulses of direct current are induced in the genrator windings 31 and applied to the slip rings 32 and 33 each sime the windings pass through the lines of force of the magnets.

In this regard, it should be noted that with the generator coils or windings 31 radially oriented, the outside leg of each winding passes through a region of relatively strong field while the inside leg passes through a region of relatively weak field as the winding tangentially passes a magnet. Therefore, although currents are induced in both end legs of the winding in the same directions and oppose each other in providing a net circulatory current flow through the winding, a substantial net current flow is produced by virtue of the current induced in the inside leg being of negligible magnitude compared to that induced in the outside leg. The pulsating current may be derived from the slip rings as by means of brushes 34 and 36 respectively bearing thereon. With the pulsating direct current generator arranged in the foregoing manner, a rotor driving arrangement of the type described with respect to the motor of FIGURES 1–3 may be employed with the rotor coils 23 suitably wound and appropriately connected to the solar cells 24 to generate magnetic poles at their ends adjacent the magnets 14 all of the same polarity which may be either similar or opposite to the poles of such magnets. In this instance, the mask 27 may be of the same configuration as described hereinbefore with respect to the motor.

The generation of alternating current requires further modification of the solar motor beyond that required in the generation of pulsating direct current. More particularly, in order that the current induced in the generator windings 31 undergo a reversal in polarity, the stator magnets must be successively of alternate polarity, as indicated in FIGURE 4. In addition, the generator windings 31 must be wound successively in opposite directions or successively oppositely connected in order that successive ones of the windings in passing through the successive magnetic fields of the magnets of alternately opposite polarity generate additive potentials throughout the series string of the windings. Of course, as the rotor rotates a sufficient amount commensurate with a given one of the generator windings 31 passing two successive ones of the magnets 14, a complete alternating current cycle is generated consisting of peaks of alternately opposite polarity. To facilitate driving of the rotor continuously in a given direction, where successive stator magnets are alternately of opposite polarity, the coils 23 must be appropriately wound and connected to the solar cells 24 in such a manner that the magnetic poles generated by successive coils at their ends adjacent the magnets are likewise alternately of opposite polarity. Accordingly, where the rotor is oriented such that the poles of the coils 23 adjacent the magnets 14 have polarities opposite thereto, the attractive forces between the coils and the magnets are such as to rotate the rotor in a direction approaching the magnet. In the event the same coils were again energized in approaching the next successive ones of the magnets, their ends adjacent the magnets would at this time be of the same polarity and magnetic repulsive forces would be established therebetween tending to drive the rotor in the opposite direction. It will, accordingly, be appreciated that in the event a mask of the configuration employed in the embodiments of FIGURES 1-3 were employed in the alternating current generator embodiment of FIGURE 4, in a similar relationship to the solar cells 24, the rotor would oscillate, rather than rotate continuously in a given direction. Therefore, in the embodiment of FIGURE 4, the mask configuration and the physical relationship of the solar cells thereto must be somewhat modified in order to facilitate driving of the rotor in a single given direction. This may be accomplished, for example, by positioning the solar cells associated with the successive coils 23 alternately of opposite polarity at different radii of the rotor. More particularly, the solar cells connected to the south pole producing coils 23 may be positioned on the outer face of the rotor at a small radius while the solar cells associated with the north pole producing coils may be positioned at a relatively large radius, as depicted in FIGURE 4. A modified form of mask 37 may then be employed to facilitate energization of the cells only at positions adjacent alternate ones of the magnets 14. More particularly, the mask 37 includes circumferentially spaced apertures 38 at a small radius corresponding to that of the solar cells connected to the south pole producing coils. The mask is positioned with respect to the stator such that the apertures 38 are adjacent alternate ones of the magnets 14, for example, the apertures 38 may be in close counterclockwise spaced relation to the magnets 14 having north poles adjacent their inner ends. The mask 37 further includes apertures 39 positioned at a relatively large radius corresponding to that of the solar cells associated, for example, with the north pole producing coils 23. In the present particular illustrative example, the apertures 39 are accordingly in close counterclockwise spaced relation to the magnets 14 productive of south poles at their inner ends. Thus, with the solar cells positioned beneath the apertures 38 and 39, light impinges upon the cells and their associated coils are energized to, in turn, generate magnetic fields having polarities opposite to the adjacent magnets 14. Magnetic attractive forces are accordingly established between the coils and the magnets which, in the illustrated embodiment, effect rotation of the rotor in the clockwise direction. When the coils are directly opposite the magnets, the solar cells underlie opaque regions of the mask 37 and are accordingly deenergized whereby the inertia of the rotor continues its rotation as the coils rotate past the magnets. Now, as the coils approach the next successive ones of the magnets having polarities at their inner ends which are the same as those which would be generated at the adjacent ends of the coils if they were energized, the associated solar cells are still beneath opaque regions of the mask 37. As the rotor is inertially rotated further to a position wherein the coils approach magnets of opposite polarity, the solar cells pass beneath another one of the apertures 38 and 39 whereby the coils are re-energized and attracted towards the opposite polarity poles of the adjacent magnets. Thus, by virtue of the arrangement of the mask 37 and the disposition of the solar cells alternately at different radial positions, rotor rotation continuously in a given direction is facilitated. At the same time, of course, successive ones of the magnets 14 being of opposite polarity, the generating coils 31 in being rotated adjacent same, generate the desired alternating current derivable from the brushes 34 and 36. This embodiment will be seen to include a motor which need not have generator windings.

It should be noted that solar motors and the like of the general type outlined hereinbefore have inherent light seeking properties. For example: consider the case of a motor with no mask, a light source offset from the axis of the motor, and all of the field pole magnets except one removed. Such an arrangement is illustrated in FIGURE 6 with only a pair of armature windings being employed on the rotor. In the illustration, a rotor 37 is mounted for rotation concentrically of a stator 38 provided with a single field magnet 39. Two coils 41 and 42 are provided at circumferentially spaced positions of the rotor with their axes radially disposed. A pair of solar cells 43 and 44 are carried at corresponding positions of the rotor and respectively connected in energizing relation to the coils. The solar cells are connected so that the current in each of the coils shown will produce opposing torques when the coils are positioned in equal circumferential spaced relation to the magnet 39 as shown with each coil being repelled from the magnet. With a light source 46 aligned with the magnet 39, equal currents will be produced in each of the solar cells and the opposing torques will be equal such that the rotor will be locked in place. If the light source is moved so that it is more in line with one of the solar cells, more current will be generated by this cell and less current by the other cell. The unbalance in the currents in the coils will produce a net torque that will rotate the rotor toward the light source. This rotation will move the two cells toward a more balanced illumination and the rotor will stabilize in a new position. If the light source is rotated further so that the windings that were opposing rotation toward the light source begin to pass the magnet pole, there will be no stable position and the rotor will continue to rotate toward the direction that the light source is displaced from the magnet. Thus, it is possible to provide continuous rotor rotation in the absence of an apertured mask.

Although the invention has been described hereinbefore and illustrated in the drawings with respect to several specific embodiments thereof, it will be appreciated that various modifications and variations may be made therein without departing from the spirit and scope of the invention. For example, although the stator magnets have been illustrated and hereinbefore described as being permanent magnets, it will be appreciated that same may be as well provided as coils energized by auxiliary solar cells.

Furthermore, it should be noted that a solar motor of the type described may be provided which is operable in the absence of stator magnets directly associated with the stator. More particularly, the earth's magnetic field may comprise the stator field, in which case a two pole motor is provided wherein the north and south poles of the earth's magnet field function as stator magnets. Thus, it is not intended to limit the invention except by the terms of the appended claims.

What is claimed is:

1. A solar motor comprising a stator having a plurality of circumferentially spaced field magnets, a rotor mounted for rotation concentrically of said stator, a plurality of circumferentially spaced armature coils carried by said rotor to generate upon energization magnetic fields for interaction with the fields of said magnets, a plurality of photovoltaic converters each including at least one solar cell carried by said rotor at circumferentially spaced positions corresponding to said coils and each converter being connected across a single coil in energizing relation thereto to energize the coils by solar energy incident upon said solar cells, and a mask of opaque material disposed in fixed relation to said stator adjacent said photovoltaic converters to block light from reaching same said mask having a plurality of circumferentially spaced apertures for the transmission of light therethrough onto said converters, said apertures being respectively disposed in circumferentially spaced relation to said magnets, whereby said converters moving beneath said apertures periodically generate a pulsating unidirectional current through said armature coils for maximum motor torque.

2. A solar motor comprising a cylindrical stator having a plurality of circumferentially spaced field magnets, a generally cylindrical rotor mounted for rotation concentrically of said stator and having an outer end face with an inclined rim, a plurality of circumferentially spaced armature coils carried by said rotor to generate upon energization magnetic fields for interaction with the fields of said magnets, a plurality of photovoltaic converters each including at least one solar cell mounted upon the inclined rim of said rotor at circumferentially spaced positions of correspondence with said armature coils and individually connected in energizing relation to separate coils, and a generally dome-shaped mask of opaque material including an inclined peripheral rim portion, said mask secured to said stator with said rim portion overlying the rim of said rotor, said mask having a plurality of circumferentially spaced apertures in said rim portion in close circumferentially spaced relation to said magnets and respectively adapted for overlying alignment with said converters, whereby said converters are exposed through said apertures to generate a variable coil current reaching a maximum immediately before the coil aligns with a magnet.

3. A solar energized alternating current generator comprising a generally cylindrical stator having a plurality of circumferentially spaced magnets oriented to generate magnetic fields alternately of north and south polarities, a generally cylindrical rotor mounted for rotation concentrically within said stator, a plurality of armature coils carried by said rotor at circumferentially spaced positions thereof, a first plurality of solar cells mounted upon an end face of said rotor at a first radius thereof and at circumferentially spaced positions of correspondence with alternate ones of said coils and connected thereto for energization thereof commensurate with generation of magnetic fields having north polarities adjacent said stator, a second plurality of solar cells mounted upon said end face of said rotor at a second radius thereof and at circumferentially spaced positions of correspondence with the remaining ones of said coils and connected thereto for energization thereof commensurate with generation of magnetic fields having south polarities adjacent said stator, a plurality of generator windings carried by said rotor at circumferentially spaced positions respectively intermediate said armature coils, a pair of slip rings coaxially secured to said rotor in insulated relation to each other, means connecting said generator coils in additive series between said slip rings, and a mask of opaque material secured to said stator in overlying relation to said cells, said mask having a first plurality of apertures at said first radius for registry with said first plurality of solar cells and disposed in close circumferentially spaced relation to alternate ones of magnets, said mask having a second plurality of apertures at said second radius for registry with said second plurality of solar cells and disposed in close circumferentially spaced relation to the remaining alternate ones of said magnets.

4. A solar motor comprising a stator having a plurality of circumferentially spaced radially oriented magnets, a rotor mounted for rotation concentrically of said stator, a plurality of armature coils carried by said rotor in circumferentially spaced radial planes, a plurality of solar cells mounted upon an end face of said rotor at circumferentially spaced positions of correspondence with said coils and respectively connected in energizing relation thereto, and a mask disposed in overlying relation to said end face of said rotor and having a plurality of circumferentially spaced apertures registerable with said cells, said apertures being respectively disposed in close circumferentially spaced relation to said magnets, whereby said cells are energized through the apertures immediately before the connected coil rotates into alignment with a magnet for establishing a pulsating coil current producing maximized field interaction for rotor drive.

5. A light seeking device comprising a stator having a magnet disposed radially thereof, a rotor mounted for rotation concentrically of said stator, a pair of coils carried by said rotor at circumferentially spaced positions thereof, and a pair of solar cells mounted upon an exposed end surface of said rotor at circumferentially spaced positions of correspondence with said coils and respectively connected in energizing relation thereto, said cells being connected to establish like poles of opposite polarity to the polarity of the inner end of the stator magnet, whereby both coils are attached to the magnet to establish a condition of maximum locking torque when the magnet is aligned with a source of light and the rotor is aligned with the coils on opposite sides of the magnet.

6. A solar motor comprising a stator having a plurality of circumferentially spaced magnets oriented to generate magnetic fields alternately of north and south polarities, a rotor mounted for rotation concentrically of said stator, a plurality of armature coils carried by said rotor disposed with their axes radially thereof and having tangential spans of a length to substantially bridge adjacent ones of said magnets, a plurality of converters with each including at least one solar cell mounted upon an end face of said rotor at circumferentially spaced positions and individually connected in energizing relation to separate coils, and a mask disposed in overlying relation to said end face of said rotor and having a plurality of circumferentially spaced apertures registerable with said cells for magnetically driving said rotor without commutation.

References Cited by the Examiner
UNITED STATES PATENTS 2,919,358   12/1959   Marrison _____ 310—46
3,096,467   7/1963    Angus _____ 318—138

MILTON O. HIRSHFIELD, *Primary Examiner.*

ORIS L. RADER, *Examiner.*

J. W. GIBBS, *Assistant Examiner.*